(12) United States Patent
Boivie et al.

(10) Patent No.: US 7,584,352 B2
(45) Date of Patent: Sep. 1, 2009

(54) PROTECTION AGAINST DENIAL OF SERVICE ATTACKS

(75) Inventors: Richard Harold Boivie, Monroe, CT (US); Jun Tung Fong, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 10/308,605

(22) Filed: Dec. 4, 2002

(65) Prior Publication Data

US 2004/0111635 A1  Jun. 10, 2004

(51) Int. Cl.
*H04L 9/00* (2006.01)
*G06F 9/00* (2006.01)
*H04L 12/28* (2006.01)

(52) U.S. Cl. .................. 713/160; 713/152; 726/13; 370/256

(58) Field of Classification Search .............. 713/189, 713/152, 160; 726/13; 370/256
See application file for complete search history.

(56) References Cited

U.S. PATENT DOCUMENTS

| | | | |
|---|---|---|---|
| 6,044,402 A * | 3/2000 | Jacobson et al. | 709/225 |
| 6,310,892 B1 * | 10/2001 | Olkin | 370/473 |
| 6,587,875 B1 * | 7/2003 | Ogus | 709/223 |
| 7,002,988 B1 * | 2/2006 | Benedyk et al. | 370/467 |
| 2004/0008681 A1 * | 1/2004 | Govindarajan et al. | 370/394 |
| 2004/0153642 A1 * | 8/2004 | Plotkin et al. | 713/150 |

* cited by examiner

*Primary Examiner*—Nasser G Moazzami
*Assistant Examiner*—Mohammad W Reza
(74) *Attorney, Agent, or Firm*—Michael J. Buchenhorner P.A.; Vazken Alexanian

(57) ABSTRACT

An information processing system for protecting against denial of service attacks comprises an interface (310) to receive and send packets, wherein the packets comprise at least one synchronization packet that is part of a handshake process for establishing the connection between the source client computer (118) and the target server computer (102); a crypto engine (306) adapted to create a unique sequence number for inclusion in a packet to be sent to a client (118) requesting establishment of a connection between a client (118) and server (102), wherein the crypto engine (306) is further adapted to validate unique sequence numbers in received synchronization packets that are part of a handshake process for establishing the connection between the source client (118) and the protected server (102); and a lookup table (304) for storing information defining established connections between the server (102) and clients so that arriving packets that purport to be part of an established connection can be validated by comparing information in the packet with entries in the table.

18 Claims, 4 Drawing Sheets

PROTECTION AGAINST DENIAL OF SERVICE ATTACKS

BACKGROUND OF THE INVENTION

1. Field of the Invention

The invention generally relates to information processing systems and more specifically to a mechanism for protecting a server computer system or a server in a server farm from denial of service attacks.

2. Description of the Background Art

Applicant's commonly-owned co-pending U.S. patent application Ser. No. 09/650,524 entitled "Method for Protecting Web Servers Against Various Forms of Denial-of-Service Attacks" is incorporated by reference herein in its entirety.

A denial of service attack (DOSA) is an assault on a network site that overwhelms the network with so many requests for service that regular traffic is either slowed or completely interrupted. DOSAs against well-known web sites, such as the FBI's site, have become a problem in recent years. Moreover, as the threat of terrorism becomes more acute, countermeasures against denial of service attacks present a daunting challenge to operators of web sites. These attacks can take several forms such as attacks based on ICMP (Internet Control Message Protocol) packets, UDP (user datagram protocol) packets, and TCP (transmission control protocol) packets. Many types of DOSAs and related terms are described below.

Also described below are some known countermeasures to shield servers and/or server farms against a DOSA. Unfortunately, the methods used today are DOSA-type specific and some of them can actually contribute to slowing down the server by expending too much of the server's time and resources in verifying connections. A method is needed which can handle various forms of DOSAs without tying up memory or processor time.

Definition of Terms

ACK

Acknowledgment of receipt of transmission, used in communications networks.

AES

Advanced Encryption Standard. A state-of-the-art encryption standard that is being developed by the NIST. It is expected to replace DES. See "Computer Desktop Encyclopedia," 9th Edition, McGraw-Hill 2001 by Alan Freedman (hereafter "Freedman")

CAM

Content Addressable Memory (CAM). Also known as "associative storage," content addressable memory differs from RAM in the way values in memory are returned. A standard RAM returns the value stored at a particular address. A CAM returns a value based upon the contents of memory. CAMs can provide a performance advantage over RAMs since they can compare a desired value against an entire set of stored values simultaneously and return the address where the value is stored in a single clock cycle.

Denial of Service Attacks

A set of one or more packets that is sent to a web site or other site on the Internet for the purpose of "bogging down" or disabling the site. Denial of service attacks against the FBI web site and Yahoo and eBay have been in the news in recent years.

DES

Data Encryption Standard. A NIST-standard secret key cryptography method that uses a 56-bit key. DES is based on an IBM algorithm which was further developed by the U.S. National Security Agency. It uses the block cipher method which breaks the text into 64-bit blocks before encrypting them. There are several DES encryption modes. The most popular mode exclusive ORs each plaintext block with the previous encrypted block. DES decryption is very fast and widely used. The secret key may be used in more than one session. Or, a key can be randomly generated for each session, in which case the new key is transmitted to the recipient using a public key cryptography method such as RSA. See Freedman.

Firewall

A firewall is an information processing system that sits between the Internet and a server or between the Internet and an enterprise network to protect the server or the enterprise network from various forms of Internet-borne attacks.

Leaky Bucket

A mechanism used in certain networks to limit the influx of bursty traffic (data that arrives in spurts). The input traffic is temporarily stored in a buffer (the "bucket") and then is output ("leaks") at a steady rate. If the input rate exceeds the programmed rate for a certain amount of time, the buffer overflows and traffic is discarded.

NIST

National Institute of Standards & Technology, Washington, D.C. The standards-defining agency of the U.S. government, formerly the National Bureau of Standards. See Freedman.

Ping Attacks

This is an attack in which the attacker attempts to "bog down" a site by sending it a stream of "ping" packets. A ping is an ICMP echo request packet. A network node is supposed to respond to an ICMP echo request with an ICMP echo response. A ping is normally used to determine if a host is up and if the path to and back from the host is working. But if an attacker sends large numbers of pings very rapidly, the host can get bogged down responding to pings, making it difficult for the host to provide service to legitimate users.

Random Early Drop

Random Early Drop is a defense against a TCP SYN (or SYN Flood) attack. When a new TCP SYN packet comes along, the TCP implementation in a server determines whether any free TCP control blocks are available. If so, the server allocates one to the new "partially established" connection. If not, it uses a TCP control block from an existing "partially established" TCP connection. Since "real" TCP connections will not normally stay in the "partially established" state for very long—because the third packet in the 3-way handshake will normally arrive "shortly" after the sending of the second packet in the 3-way handshake, the re-use of the "partially established" TCP connection's control block will usually not impact legitimate traffic but it will reclaim control blocks so that they can be used for legitimate TCP connections.

Rate Limiting

Rate limiting is a useful defense against some DOSAs. A mechanism in front of the server (or server farm) can protect a server/server farm from attacks that are not TCP-based by limiting the rate at which non-TCP packets are allowed into the server/server farm. Rate limiting can minimize the impact of attacks that are not TCP-based and since there is no reason that a typical web server should be receiving large volumes of non-TCP traffic, the rate limiting of non-TCP traffic does not affect any "real" traffic. (Note that it may be useful to allow (some) ICMP packets into a server farm to diagnose network problems, for example; but there is no reason why a web server farm should be subjected to ICMP packets at a rate of 10 gigabits/second, for example. This rate limiting can be done using what is known in the networking industry as a "leaky bucket." But rate-limiting of TCP packets cannot be used as a defense against TCP-based attacks because the "real" traffic to a server farm (e.g. web traffic or mail traffic) is TCP-based, and thus such rate limiting would limit the flow of the "real" traffic as well as the "attack" traffic.

Rijndael Algorithm

Rijndael is a block cipher, designed by Joan Daemen and Vincent Rijmen as a candidate algorithm for the AES. The cipher has a variable block length and key length. Keys with a length of 128, 192, or 256 bits to encrypt blocks with a length of 128, 192 or 256 bits (all nine combinations of key length and block length are possible) can be generated. Both block length and key length can be extended very easily to multiples of 32 bits. Rijndael can be implemented very efficiently on a wide range of processors or in special-purpose hardware. The Rijndael algorithm was selected by NIST as the base for AES.

Smurf Attacks

This is an attack in which the attacker sends "broadcast" ping packets to a large group of machines with a forged source address such that the source address in the packet is that of the "target" node, i.e., the machine that the attacker wants to disable. When the broadcast ping is received by the presumably large number of machines, they each respond to the ping by sending an echo reply to the address that was in the source address field in the broadcast ping packet. Since the source address is that of the target, the target gets swamped with large numbers of echo replies. The target throws these away but the load on the target and the load on the link connecting the target to the network is large and this load can bog down both the node and the link.

Spoofing

Faking the source address of a transmission.

SYN

A synchronization packet used in establishing a TCP connection.

SYN cookies (also known as TCP SYN cookies or TCP cookies)

A TCP SYN cookie is a mechanism for dealing with a SYN flood.

A TCP SYN flood (see SYN flood below) was generally considered to be an insoluble problem. See, for example, "Practical UNIX and Internet Security," by Garfinkel and Spafford, page 778:

The recipient will be left with multiple half-open connections that are occupying limited resources. Usually, these connection requests have forged source addresses that specify nonexistent or unreachable hosts that cannot be contacted. Thus, there is also no way to trace the connections back. . . . There is little you can do in these situations . . . any finite limit can be exceeded.

SYN cookies solve this problem using cryptographic techniques. A SYN cookie is a particular choice of an initial TCP sequence number by a TCP server that can be sent in a SYN-ACK. The particular choice of sequence number allows the server to participate in the 3-way handshake without tying up any memory on the server; and
do this in such a way that an attacker cannot fake a legitimate third packet in the 3-way handshake.

The sequence number can be a combination of the target server's IP address and port number and the source client's IP address and port number. The Rijndael algorithm can be employed to generate a hard-to-guess value so that an attacker cannot fake a third packet in the 3-way handshake.

SYN Flood (Also Known as a TCP SYN Flood)

A TCP SYN flood attack works as follows. The attacker sends a large number of TCP SYNs to the target. The attacker typically uses fake source addresses in these packets so that these packets cannot be easily traced back to the attacker. The attacker also typically uses a different source address in each packet to make it hard for the target to know that it is the subject of a TCP SYN attack. Each time a SYN is received, the target responds with the second packet in the 3-way handshake. It also allocates some "resources," such as a TCP control block that will be used to keep track of what's going on in the TCP connection. If enough TCP SYNs come in, lots of resources get tied up. Those resources are not freed for some time because the target is expecting the third packet in the 3-way handshake but the third packet never arrives. The targets may eventually time-out these partial connections and free these resources but if enough resources get tied up, the target runs out of resources and is not able to respond to legitimate traffic.

TCP

TCP is the Transmission Control Protocol. TCP is used to provide a "reliable" connection between 2 nodes in an internet. TCP uses sequence numbers, checksums, acknowledgements (or ACKS) and retransmissions of lost or garbled data to provide reliability. TCP is used by applications in which it is important to deliver bytes correctly such as mail, web browsing, etc.

TCP ACK Flood

This is an attack in which the attacker sends a flood of TCP packets in which the ACK flag is set. The ACK flag is normally set to acknowledge the reception of ungarbled data but an attacker may set the ACK flag in a flood of packets in an attempt to make his packets appear to be part of an established and legitimate TCP connection so that the attack packets won't get filtered out by a firewall.

TCP Connection/Watching SYNs and FINs

A TCP connection has two "ends" where each is defined by an IP address and a TCP port number. A TCP connection is established in a 3-way handshake via an exchange of SYN and ACK packets and ended via a 3-way exchange of FIN (French for "end") packets. If one keeps track of the SYN and FIN exchanges one can determine if a TCP packet is part of a legitimate TCP connection or if it is an attack packet from some attacker that ought to be discarded.

UDP

UDP is the User Datagram Protocol. The UDP doesn't provide sequence numbers, acknowledgements (ACKs), retransmissions or reliability. It is used by applications in which the "timeliness" of packet delivery is important and the retransmission of lost or garbled data is not important. IP telephony is an example in which the timeliness of packet delivery is important and the retransmission of lost or garbled packets is not useful.

UDP Flood

An attack in which the attacker sends large numbers of UDP packets. A UDP flood is similar to a ping attack.

Wire-speed

Wire speed is the ability to process packets as fast as they are received from the network.

3-way Handshake

A TCP connection is set up with a 3-way "handshake" that works as follows. The initiator sends a SYN packet that includes some "synchronizing" information. The server responds with a SYN packet that includes some synchronizing information of its own. The server's SYN packet also acknowledges (ACKs) the synchronizing information that was received from the initiator. The initiator ACKs the information in the server's SYN packet.

5-tuple

The 5 items of information that are found in a TCP packet that uniquely identify a particular TCP connection: the destination IP address, the source IP address, the protocol field that indicates that the IP packet includes a TCP segment, the TCP destination port and the TCP source port. Since the protocol field (which indicates TCP) does not necessarily need to be stored in a table of TCP connections, a table of TCP connections might store only the other 4 items (4-tuples).

There are many forms of denial of services attacks and there is a need for a countermeasure against DOSAs that overcomes the shortcomings of the prior art.

SUMMARY OF THE INVENTION

A mechanism for protecting at least one target server computer from denial of services attacks launched by at least one source client computer comprises a crypto engine and a fast lookup engine. The crypto engine is used to generate and validate TCP SYN cookies to defend against TCP SYN flood attacks. The fast lookup engine is used to quickly determine whether a packet that purports to be part of a previously established TCP connection actually is part of a legitimately established connection to defend against TCP ACK attacks. The mechanism also optionally includes a "leaky bucket" mechanism for rate-limiting non-TCP traffic to defend against non-TCP-based attacks.

DETAILED DESCRIPTION OF THE INVENTION

Figure 1:
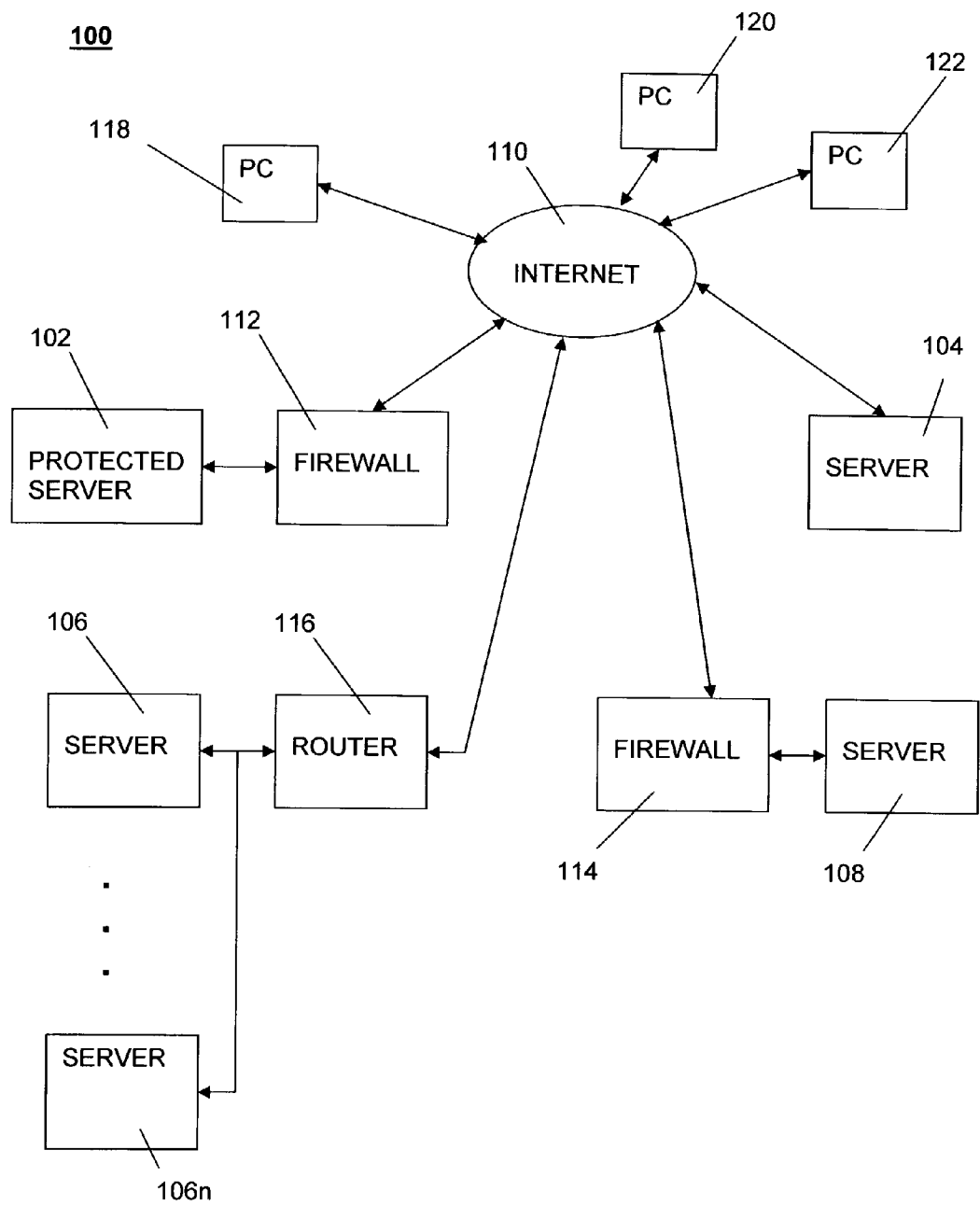
FIG. 1 is a block diagram of a network using a system for protecting against DOSAs.

FIG. 1—Block Diagram of a Communications Network

Referring to FIG. 1, there is shown a simplified version of a communications network 100 wherein an embodiment of the invention can be advantageously deployed to defend against DOSAs. In this embodiment the network 100 operates according to the TCP/IP suite of protocols but the principles of the invention also apply to any packet switched network that uses packet integrity confirmation techniques analogous to that of the TCP/IP. The network 100 comprises (includes but is not limited to) a plurality of servers 102, 104, 106-106n, and 108, all connected to the Internet 110.

The network also comprises firewalls 112 and 114, a router 116, and a plurality of personal computers (PCs) 118-122. Assume that the user of unit 118 (the source client computer) launches a TCP-based attack against a target server 102 which is protected by a firewall unit 112. The firewall unit 112 is an information processing system which can be adapted to prevent DOSAs according to an embodiment of the invention. The firewall unit 112 may be so adapted by using specialized hardware such as one or more application-specific integrated circuits (ASICs) or by programming general purpose programming hardware. The firewall unit 112 DOSA mechanism protects the server 102 by discarding TCP traffic that fraudulently purports to be part of an existing TCP connection (i.e., a TCP packet that has the ACK bit set in the TCP header when the TCP connection defined by the packet's TCP 5-tuple has not been established in a TCP 3-way handshake). It also shields the server 102 from TCP SYN packets that attempt to establish new TCP connections until those attempts are "validated" in a 3-way handshake by the DOSA protection mechanism embodied in the firewall unit 112. It passes TCP packets that are part of a legitimate TCP connection on to the server 102 and passes packets from the server 102 back to the client 118 (after modifying those packets as described below).

Figure 2:
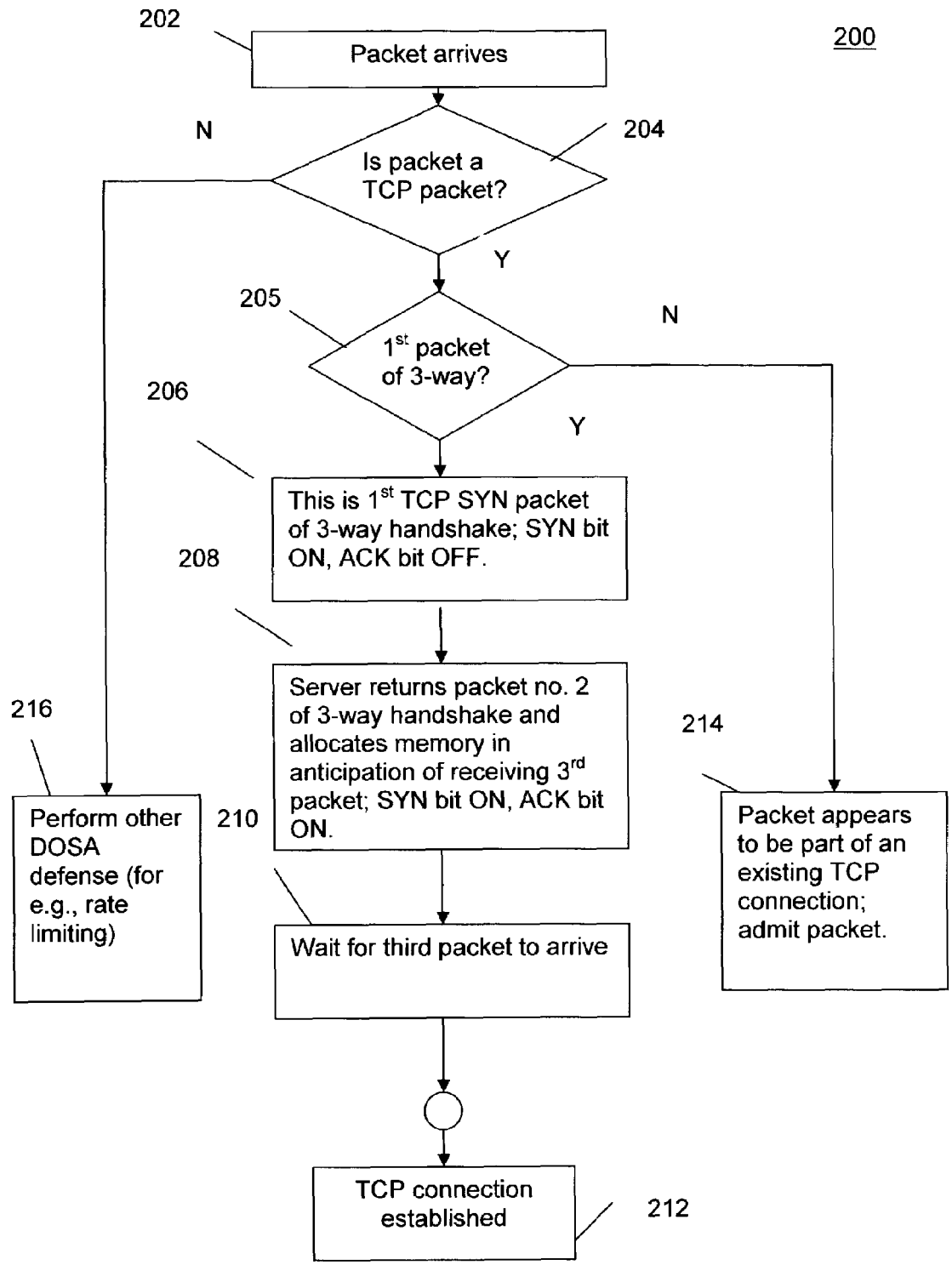
FIG. 2 is a flow chart illustrating a method for performing a 3-way handshake to establish a connection, according to a known method.

FIG. 2—Flowchart Illustrating the 3-way Handshake

FIG. 2 illustrates a method for protecting against denial of service attacks between a source client and a target server according to the prior art. The flowchart 200 shows two different paths that can be followed, depending upon whether the packet is a TCP packet or not. The first step is the receipt of a packet at a target server or server farm in step 202. In step 204 a test is made to determine if the arriving packet is a TCP packet. If the packet is determined to be a TCP packet, then in step 205 a determination is made as to whether the TCP packet is the first packet in a 3-way handshake. If it is, then in step 206, it is established that this packet is trying to initiate a TCP connection, with its SYN bit set to ON and its ACK bit set to OFF (SYN=1, ACK=0) in the TCP header. The SYN bit indicates that the packet contains an initial sequence number (i.e. synchronizing information) that the client will use for data that is sent from the client to the server. This is the first step in the 3-way handshake that is used to initiate a connection. If, in step 205, the arriving TCP packet is not the first packet in a 3-way handshake, that is, if it appears to be part of an existing TCP connection, the packet will be admitted in step 214.

In step 208, the server 102, after receiving the TCP SYN packet from the client 118, will acknowledge the first SYN packet by returning the second packet in the 3-way handshake. This packet header will have its ACK bit set to ON, to acknowledge the client's initial sequence number and the SYN bit will be ON as well (SYN=1, ACK=1). This SYN bit indicates that the packet contains an initial sequence number that the server will use for data that is sent from the server 102 to the client 118. At this point the server 102 will allocate memory resources for this partially established connection in the expectation that it will receive the third packet in the 3-way handshake acknowledging the server's initial sequence number. When this packet is received by the client 118, the client ACK's the server's initial sequence number and the connection is established. Note that since there can be many simultaneous (established or partially established) connections at the server 102 and at the client 118, both the server 102 and the client 118 need to look at the 5-tuples in a TCP packet to match a given packet up with an appropriate TCP connection.

If the third packet in the 3-way handshake arrives as expected in step 210, it will have its SYN bit OFF and its ACK bit ON (SYN=0, ACK=1). In the meantime, while waiting for the third packet to arrive to complete the handshake process, the server 102 has tied up its memory resources. When the packet does arrive, the server 102 accepts this packet and the new TCP connection will be established. However, the source client node 118 could also be part of a denial of service attack known as a TCP SYN attack, or TCP SYN flood. In a TCP SYN flood, the attacker sends a large number of TCP SYN packets that appear to be requests for new connections from a large number of distinct clients. The idea is to get the server 102 to respond to each of these packets with the second packet in the 3-way handshake and allocate resources (e.g. memory) to each of these partially completed connections. The memory will remain tied up until the third packet arrives to complete the 3-way handshake. But in a TCP SYN attack the third packet in the 3-way handshake is never sent and a great deal of memory can be tied up in partially established connections limiting the server's ability to respond to legitimate requests. Eventually, the server 102 may free resources, but there is the danger that the server 102 will not be able to respond to legitimate TCP traffic.

If in step 204 it is determined that the packet is not a TCP packet, then the server 102 may use "rate limiting" as a defense in step 216. This is where a mechanism, such as a firewall unit 112, will accept non-TCP packets, but at a limited rate. This defense is sometimes used in the networking industry and is more commonly known as a "leaky bucket." Unfortunately, rate limiting is not an adequate defense against TCP-based attacks.

The 3-way handshake process ends in step 212 with the server 102, or the firewall unit 112, establishing the TCP connection which will subsequently be used to send data from the client 118 to the server 102 and then to send data back from the server 102 to the client 118.

Figure 3:
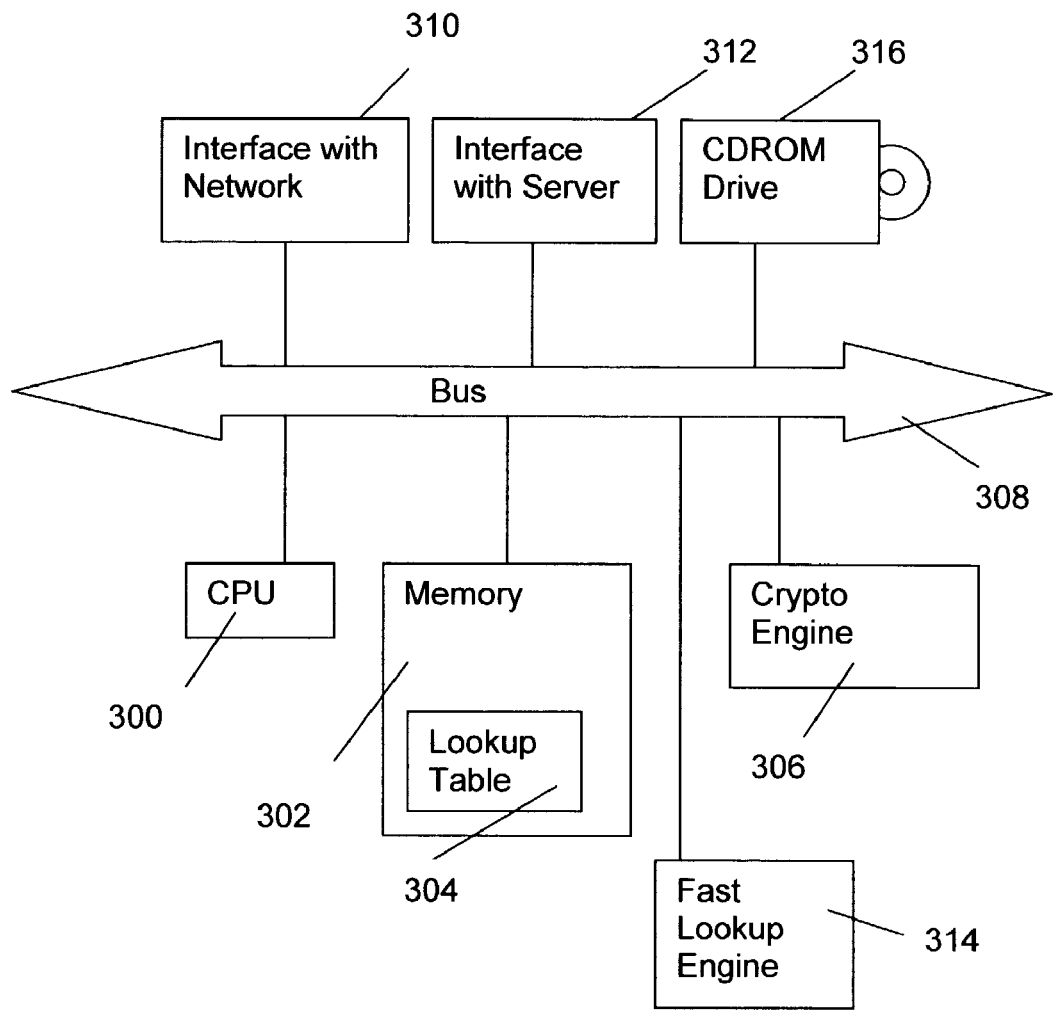
FIG. 3 is a block diagram of a system for protecting a network node against DOSAs.

FIG. 3—Block Diagram of a System for Protecting Against DOSAs

Referring to FIG. 3, there is shown a highly simplified block diagram of the components of the firewall unit 112. According to a preferred embodiment, the mechanism for protection against denial of services attacks is deployed in the firewall unit 112. It should be understood that the firewall unit 112 comprises a CPU 300 that is adapted to operate according to the principles of the invention, a memory (e.g., DRAM and/or disk storage) 302, itself comprising a fast lookup table 304, a lookup table engine 314 and a high-speed crypto engine 306. In another embodiment, the fast lookup table 304 could be part of the fast lookup engine 314. These are all connected by a bus (or a set of buses) 308. The crypto engine 306 is used to generate and validate TCP SYN cookies at high speeds. The fast lookup engine is used to validate, at high speed, whether or not a TCP packet that purports to be part of an already established connection really is part of an established connection.

The firewall unit 112 also comprises a network interface 310 that receives and transmits packets to and from the network 100 and a server interface 312 that communicates with the server 102. In general, the DOSA protection mechanism distinguishes between packets that are part of an existing TCP connection and those that fraudulently purport to be legitimate by using the fast lookup engine 314 to determine if a packet's 5-tuple is in the lookup table 304. The crypto engine 306 and the fast lookup engine 314 are used to defend against TCP-based attacks (i.e. SYN floods and ACK floods). DOSA attacks based on traffic other than TCP packets can be handled with a "rate limiting" mechanism such as a "leaky bucket".

This mechanism is readily adaptable for use in different environments. Our example illustrates the mechanism as part of a firewall 112, but other embodiments can and should be contemplated within the scope and spirit of the invention. The DOSA mechanism can be used from within a network adapter in a server or in a network box, such as a router, firewall, web cache, load-balancer, content switch, etc. which will sit "in front" of a server or server farm. The mechanism provides distinct advantages when used in different embodiments. For example, placing the DOSA protection mechanism in the router provides the advantage of allowing a variety of different server types to be protected, whereas placing the DOSA mechanism in a network adapter in a server provides additional scalability.

The CPU 300 protects against a TCP SYN flood by implementing an encrypted sequence number scheme (cookie scheme), and protects against TCP ACK attacks using a fast lookup engine 314. An advantage of the cookie scheme is that memory resources are not tied up because information regarding partially completed TCP connections does not need to be stored. The firewall unit 112, using the CPU 300, can confirm that a packet completes a legitimate 3-way handshake (described further in FIG. 4) without having had to store anything in memory. This is accomplished through the use of the crypto engine 306 and the cookie scheme. The crypto engine 306 generates and validates a unique sequence number for an incoming packet. Since the sequence number generated by the crypto engine 306 is a function of a secret key as well as information from the initial SYN packet, attackers cannot forge packets that appear to complete the 3-way handshake. It is critical to employ an effective encryption method to choose sequence numbers for the cookie scheme. If an attacker can guess the sequence number that a server will send in response to a client's initial SYN packet, the attacker would be able to establish fraudulent TCP connections and tie up resources on the server.

There are different ways to generate these unique sequence numbers. One way is to use the Rijndael algorithm which can be implemented efficiently on a wide range of processors ranging from specially-programmed general purpose processors to specialized hardware. In a preferred embodiment of this invention, the Rijndael algorithm can be used to create a sequence number combining identifying information from both the source client 118 and the target server 102 (such as the IP address and port number), along with the client's initial sequence number and some measure of the current time. Additionally, other encryption algorithms and methods could be contemplated within the scope of this invention.

Once a legitimate TCP connection has been established the 5-tuple that defines that connection is stored in the lookup table 304. These stored 5-tuples are used to confirm the validity of a TCP packet that purports to be part of an existing connection. The table lookups must be performed quickly and efficiently due to the high volume of TCP packets that are received at web servers. There are several known table lookup technologies available today which could be used for the fast lookup engine 314.

One way to implement a fast lookup engine 314 is through the use of Content Addressable Memory (CAM). This is an ideal method to use because you can compare a search field (in this case, the packet's 5-tuple) with all of the entries in the lookup table 304 simultaneously.

The CDROM drive 316 is an example of an input/output device for receiving computer readable media comprising program instructions according to an embodiment of the invention. It will be understood by those skilled in the art that other computer readable media can also be advantageously used within the spirit and scope of the invention.

Figure 4:
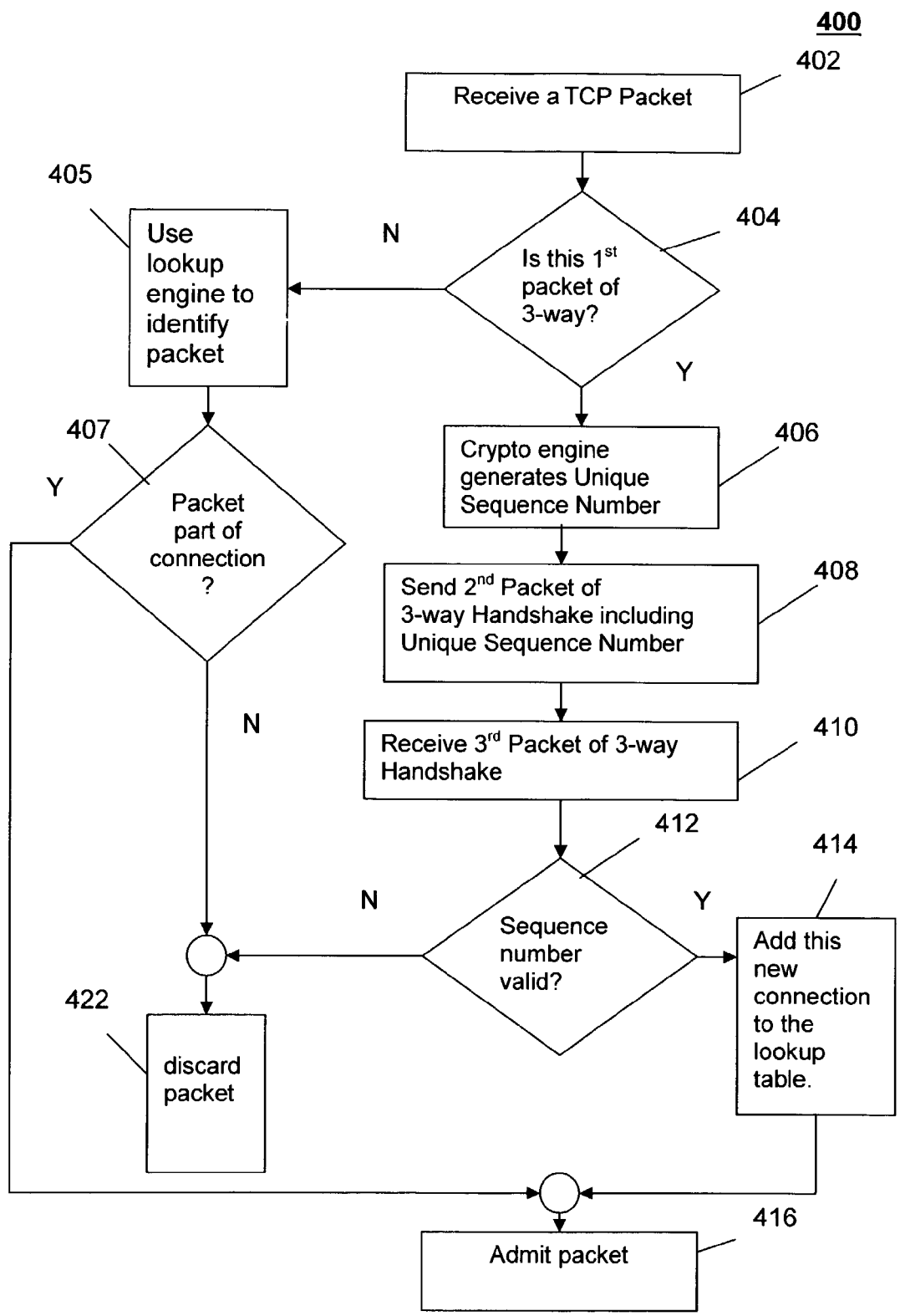
FIG. 4 is a flow chart illustrating a method using a crypto engine and a fast lookup engine for protecting a server against DOSAs, according to an embodiment of the invention.

FIG. 4—Flowchart Illustrating a Preferred Embodiment

Referring to FIG. 4, a method 400 illustrates the use of the crypto engine 306 and the fast lookup engine 314, in combination with a cookie encryption scheme, to defend against TCP-based denial of service attacks. The process begins at step 402 when a packet arrives at target server 102. In this example we will assume that the packet is a TCP packet. Non-TCP packets would be dealt with by employing known protection methods, such as rate limiting. We will focus our example on this method's handling of TCP packets.

In step 404 the firewall unit 112 determines if this packet is the first packet in a 3-way handshake that initiates a new connection. If the arriving packet purports to be part of an already existing connection (perhaps by having the ACK bit set), then in step 405 the fast lookup engine 314 does a table lookup in the lookup table 304, searching for the packet's 5-tuple of identifying information. According to this method, any packet which is part of an existing connection will have its information stored in the lookup table 304. If the information is not found in the lookup table 304 (step 407), the packet is not considered legitimate and is dropped or discarded in step 422. As stated earlier, the packet is considered to be part of an already established TCP connection if its 5-tuple of information can be found in the lookup table 304. This is a much more reliable method for determining if a packet is part of a connection than the known method which merely checks the SYN and ACK bits. Since the ACK bit is always set and the SYN bit is always clear once a TCP connection is established some simple implementations have used these bits to determine if a packet is part of an established connection. But an attacker can easily defeat this check by sending a stream of packets that have the SYN bit clear and the ACK bit set in a TCP ACK flood. The fast-lookup mechanism 314 allows the firewall unit 112 to defend against ACK attacks or ACK floods. And the crypto mechanism 306 allows the firewall unit 112 to defend against TCP SYN attacks or SYN floods.

If the arriving packet is attempting to initiate a connection, as confirmed in step 404, then in step 406 the firewall unit 112, using the crypto engine 306, generates a unique sequence number for this connection, as in the known TCP SYN cookie scheme. The sequence number generated by the crypto engine 306 may be a function of a secret key and the client's IP address and port number, the target server's IP address and port number, the client's initial sequence number and the current time. The Rijndael algorithm could be used to generate this sequence number. Note that the time could be one of various measurements of date and time. For example, on a Unix system this is typically the number of milliseconds that have elapsed since midnight, Jan. 1, 1970. This is just one example of how the time portion of the sequence number may be defined.

After the sequence number is generated in step 406, the firewall unit 112 sends back the second packet of the 3-way handshake which includes this sequence number, in step 408. The packet will be sent back to the source client 118 with its SYN bit ON and its ACK bit ON to identify that this packet is the second packet of the 3-way handshake. The next step occurs when the firewall unit 112 receives the third packet of the 3-way handshake in step 410. If this packet has its SYN bit OFF and its ACK bit ON, this will confirm that the packet purports to be the third packet of a 3-way handshake. The firewall unit 112, after verifying that the SYN bit is OFF and the ACK bit is ON, uses the crypto engine 306 to validate the sequence number (step 412) that the packet is ACKing (which should be the sequence number originally sent to the source client 118 in the second packet of the 3-way handshake in step 408). If the sequence number does not match the sequence number previously generated by the crypto engine 306, the packet is discarded in step 422. If the packet includes the correct sequence number the legitimacy is confirmed and the packet is accepted. The fast lookup engine 314 will add the packet's 5-tuple identifying information to the lookup table 304 in step 414. It is important to note that this example refers to the "5-tuple" of identifying information, but other configurations of tuples could also be employed in keeping with the spirit and scope of the invention.

The firewall unit 112 needs to perform additional functions in step 416. After validating the 3-way handshake, the firewall unit 112 opens a connection to the server/server farm and passes data through the connection. It plays the part of the server 102 in communicating with the client 118 and it plays the part of the client 118 in communicating with the server 102. But since the sequence number chosen by the server 102 will in general be different from the sequence number that the firewall unit 112 chose in communicating with the client 118, the firewall unit 112 needs to adjust sequence numbers of packets from the server 102 to the client 118 and the corresponding acknowledgment numbers of packets from the client 118 to the server 102. The firewall unit 112 will also need to adjust TCP checksums appropriately. The connection ends with the TCP shutdown sequence. The connection is shut down in two stages, one for each "direction" (client→server and server→client). First, one end sends a packet with the header's FIN bit set, which the other end ACKnowledges; then, when the other end is also finished sending its data, it sends out a FIN packet, which the other end ACKs, thereby closing the connection. The firewall unit 112 will also handle this shutdown procedure.

Since the firewall unit 112, as one possible embodiment of the invention, includes a fast lookup engine 314 and a high-speed crypto engine 306 to shield the target server 102 from denial of service attacks, the target server's 102 processor will not be slowed or impaired. Using the encrypted sequence number scheme (SYN cookie scheme with the crypto engine 306) by itself would prevent some attackers from launching successful attacks, but the addition of the fast lookup engine 314 provides additional security. Consequently, the system will not get bogged down or expend its resources on partially completed TCP connections or TCP ACK attacks.

The embodiment described herein is illustrative of the invention; however other implementations are contemplated within the scope of the following claims.

We claim:

1. An information processing system for protecting at least one target server computer from denial of services attacks launched by at least one source client computer, the information processing system comprising:

an input/output interface configured to receive and send packets, wherein said packets comprise one selected from a group consisting of: TCP packets and non-TCP packets;

generating a unique sequence number comprises an encrypted code produced by a function combining the source client computer's address and port number, the target server computer's address and port number, the source client computer's initial sequence number, and a time measurement, a hardware crypto engine adapted to create a unique sequence number for inclusion in the packet to be sent to the source client computer requesting establishment of a connection between the source client computer and the target server computer, wherein the packet comprises at least one synchronization packet that is part of a handshake process for establishing the connection between the source client computer and the target server computer; wherein the crypto engine is further adapted to validate the unique sequence number in received synchronization packets that are part of a handshake process for establishing the connection between the source client computer and the target server computer;

a lookup table for storing a tuple of information from a packet header, the tuple of information defining established connections between the target server computer and a plurality of source client computers so that received packets that purport to be part of an established connection can be validated by comparing information in the packet with entries in the lookup table;

a buffer coupled with the input/output interface for temporarily storing incoming non-TCP packets and passing said packets from the source client computer to the target server computer at a limited rate; and a fast hardware lookup engine for accessing the lookup table;

and passing data over the connection only when it is determined that the third packet is valid.

2. The information processing system of claim 1 further comprising logic for discarding the packet if said packet is not validated.

3. The information processing system of claim 1 wherein the hardware crypto engine comprises logic for generating the unique sequence number in response to a TCP SYN packet.

4. The information processing system of claim 1 wherein the hardware crypto engine is configured to perform the Rijndael algorithm for creating the unique sequence number.

5. The information processing system of claim 1 wherein the lookup table is configured to store a plurality of tuples of information from packet headers pertaining to established TCP connections.

6. The information processing system of claim 1 wherein the time measurement is a representation of a date and time at which the initial synchronization packet was received by the target server computer.

7. A method for protecting at least one target server computer from denial of services attacks launched by at least one source client computer, the method comprising:

receiving a first packet destined for the at least one target server computer, the first packet being part of a handshake process for requesting establishment of a connection between the source client computer and the target server computer, wherein said first packet comprises one selected from a group consisting of: TCP packet and non-TCP packet;

generating a sequence number comprising an encrypted code produced by a function combining the source client computer's address and port number, the target server computer's address and port number, the source client computer's initial sequence number and a time measurement, wherein the sequence number is generated by a hardware crypto engine;

sending the source client computer a second packet including the sequence number generated by the hardware crypto engine;

receiving a third packet from the source client computer;

validating the sequence number of the third packet, wherein the hardware crypto engine is used to validate the sequence number;

storing information from the packet header in a lookup table so that subsequently received packets that purport to be part of an established connection can be validated by using a fast hardware lookup engine to access the lookup table and comparing identifying information in the packet with the entries in the lookup table;

temporarily storing incoming non-TCP packets in a buffer;

passing the non-TCP packets to the protected server at a limited rate; and opening a connection from the source client computer to the target server computer and passing data over the connection only when it is determined that the third packet is valid.

8. The method of claim 7 further comprising discarding the packet if said packet is not validated.

9. The method of claim 7 further comprising generating the sequence number in response to receiving a TCP SYN packet.

10. The method of claim 7 wherein opening a connection further comprises a firewall unit adjusting the sequence number generated by the hardware crypto engine to conform to the sequence number selected by the firewall unit in its communication with the at least one source client computer in the open connection.

11. The method of claim 10 wherein opening a connection further comprises the firewall unit adjusting TCP checksums in order to conform to the TCP checksums selected by the firewall unit.

12. The method of claim 7 wherein receiving the first packet further comprises determining if the packet is a TCP packet.

13. The method of claim 12 wherein receiving the first packet further comprises determining if the first packet is part of an already established connection, if the first packet is a TCP packet.

14. The method of claim 13 wherein determining if the packet is part of an already established connection comprises locating the packet's tuple of information in the lookup table.

15. The method of claim 7 further comprising closing the connection between the source client computer and the target server.

16. The method of claim 15 wherein closing the connection further comprises engaging in a handshake process between the source client computer and the target sewer wherein the packets sent are FIN packets.

17. A computer readable storage medium for execution by an information processing system for protecting at least one target server computer from denial of services attacks launched by at least one source client computer, the medium comprising instructions for:

receiving a first packet destined for the at least one target server computer, the packet being part of a handshake process for requesting establishment of a connection between the source client computer and the target server computer; wherein the first packet comprises one selected from a group consisting of: TCP packet and non-TCP packet;

generating a sequence number comprising an encrypted code produced by a function combining the source client computer's address and port number, the target server computer's address and port number, the source client computer's initial sequence number and a time measurement, wherein the sequence number is generated by a hardware crypto engine;

sending the source client computer a second packet including the sequence number generated by the hardware crypto engine;

receiving a third packet from the source client computer;

validating the sequence number of the third packet, wherein the hardware crypto engine is used to validate the sequence number;

storing the tuple of information from the packet header in a lookup table so that subsequently received packets that purport to be part of the connection can be validated by using a fast hardware lookup engine to access the lookup table and comparing identifying information in the packet with the entries in the lookup table;

opening a connection from the source client computer to the target server computer;

temporarily storing incoming non-TCP packets in a buffer;

passing the non-TCP packets to the protected server at a limited rate; and passing data over the connection only when it is determined that the third packet is valid.

18. The computer readable storage medium of claim 17 further comprising an instruction for closing the connection between the source client computer and the target server computer.

* * * * *